United States Patent Office 2,750,417
Patented June 12, 1956

2,750,417

AMINE ALKYLATION

Rex D. Closson, Detroit, Alfred J. Kolka, Lathrup Village, Birmingham, and Waldo B. Ligett, Pontiac, Mich., assignors to Ethyl Corporation, New York, N. Y., a corporation of Delaware No Drawing. Application April 14, 1953,
Serial No. 348,816

17 Claims. (Cl. 260—577)

This invention relates to the alkylation of amines and more particularly to catalytic alkylation of amines to produce valuable alkylation products in which one or more alkyl groups have been introduced onto amine nitrogen in the amine reactant.

It has been proposed to alkylate amines with olefins using as catalysts alkali metals and their hydrides. Disadvantages of this method are that extraordinarily high pressures are required, the reaction times are exceedingly long, and frequently an undesirable distribution of products is obtained. It has further been proposed to improve the above process by the use of an inert diluent in the reaction mixture. While use of this technique has alleviated the reaction rate disadvantage to some extent, it has not helped solve the problem of unfavorable product distribution, and it has added the additional handicap of making diluent recovery necessary.

Among the objects of the present invention is that of providing a new and improved process for the alkylation of amines. Another object is to provide a new and improved catalytic alkylation process. A further object is to provide a process for alkylating amines at high reaction velocity, this process being capable of operation at little or no elevated pressure. Still another object is to provide a process for the production of N-alkylated amines, which process is capable of being regulated to give highly selected distribution of products. An additional object is to provide a high reaction velocity, low pressure amine alkylation reaction which is operative in the absence of inert diluents.

Broadly speaking, the objects of the present invention are accomplished by reacting an amine bearing at least one hydrogen on an amino nitrogen atom with a non-conjugated olefin in the presence of, as a catalyst, an amide of an alkali or alkaline earth metal. Preferably the amide should be derived from an ammonia compound (by ammonia compound we mean ammonia itself or an amine) which is not substantially more acidic than the amine to be alkylated. Usually elevated temperatures and somewhat elevated pressures are required. In this way the alkylation products obtained are those in which one or more of the hydrogen atoms on amino nitrogen in the amine reactant is replaced smoothly and readily by alkyl groups.

As stated above, the amine to be used in the present invention is any amine having at least one hydrogen on an amino nitrogen atom. This includes primary and secondary amines of the aliphatic, aromatic, alicyclic, and heterocyclic classes.

As specific examples of amines useful in the present invention, the following examples may be cited: methylamine, ethylamine, propylamine, isopropylamine, n-butylamine, sec-butylamine, isobutylamine, tert-butylamine, the various amylamines, the various hexylamines, such as n-hexylamine, and other primary amines with higher alkyl groups. Further examples of suitable amines of the aliphatic series include dimethylamine, diethylamine, di-n-propylamine, diisopropylamine, methylethylamine, methyl-n-propylamine, di-n-butylamine, butylmethylamine, and other secondary aliphatic amines having straight or branched chains containing more or less carbon atoms than those cited above.

As examples of suitable aromatic amines, the following may be cited: aniline, o-toluidine, α-naphthylamine, β-naphthylamine, the various aminoanthracenes, the various aromatic amines alkylated in the nucleus, such as p-ethylaniline, 1-amino-5-methylnaphthalene, and the like, phenanthryl amines, aminobiphenyl, and the like. Suitable secondary aromatic amines include N-methylaniline, N-propylaniline, diphenylamine, N-methyl-α-naphthylamine, N-propyl-β-naphthylamine, and the like.

Suitable alicyclic amines include cyclohexylamine, cyclopentylamine, 1-amino-1,2,3,4-tetrahydronaphthalene, etc.

Suitable heterocyclic amines include 5-aminoquinoline, 3-aminoquinoline, and other aminoquinolines, 2-, 3-, and 4-amino pyridines, aminopicolines, aminolutidines, aminoisoquinolines, and the like. Examples of secondary heterocyclic amines which may be used in accordance with the present invention include piperidine, pyrrolidine, 1,2,3,4-tetrahydroquinoline, pyrroline, carbazole, piperazine.

Of the above, the aromatic amines, particularly the primary aromatic amines such as aniline, are preferred for use in the invention, both because of their ease of utility in the process and because of the usefulness of the alkylation products obtained from these amines.

As the alkylating agent, any non-conjugated olefin is satisfactory. Preferably we employ acyclic monoolefine of 12 or less carbon atoms. Examples of our preferred alkylating agents are ethylene, propylene, butene-1, butene-2, pentene-1, pentene-2, hexene-1, hexene-2, hexene-3, the various acyclic heptenes, octenes, nonenes, decenes, undecenes, dodecenes, isobutylene, 3-methylheptene-1, 2-ethylpentene-1, 3-methylhexene-3, and the like. An especially preferred olefin in our invention is ethylene.

In addition to these preferred olefins, other olefinic materials such as cyclic olefins, non-conjugated polyolefins, and monoolefins of more than 12 carbon atoms can also be employed. Typical examples include cyclohexene, cyclopentene, 1,4-cyclohexadiene, 1,5-hexadiene, 1,4-hexadiene, pentadecene-1, other pentadecenes and tetradecenes.

The catalysts of the present invention comprise the amides of metals selected from the group consisting of alkali metals and alkaline earth metals. These amides include both the organic and inorganic amides.

As examples of the inorganic amides, lithium amide, sodium amide, potassium amide, rubidium amide, cesium amide, magnesium amide, calcium amide, strontium amide, and barium amide may be cited. These have the formula $MNH_2$ in the case of the alkali metals and the formula $M(NH_2)_2$ in the case of the alkaline earth metals. They are generally prepared by direct reaction of the metal with ammonia, either at elevated temperature or in some cases at low temperature in liquid ammonia solvent.

The organo amides of the present invention are characterized by the formula $RNHM$ or $R_2NM$ in the case of the alkali metals and $(RNH)_2M$ or $(R_2N)_2M$ in the case of the alkaline earth metals. M represents the alkali and alkaline earth metal respectively. In both cases R may be substituted or unsubstituted alkyl, cycloalkyl, aromatic, or heterocyclic groups. The organo amides may be prepared by a variety of reactions. These include reaction of alkali or alkaline earth amide with an amine at elevated temperature, e. g. the reaction of sodamide with aniline to produce sodium anilide and ammonia. In some cases the metal can be made to react with the amine directly, as in the case of calcium, magnesium, or lithium with aniline to produce the corresponding anilide and hydrogen. An additional method of producing the organo amides is by reaction of an amine with an organoalkali or organoalkaline earth compound. An example of the latter reaction is the reaction of aniline with amyl sodium to produce sodium anilide plus pentane. In the case of the aliphatic amides, an elegant method of their preparation is reaction of the metal with the amine in the presence of a conjugated diene whereby the metal amide is produced and the diene hydrogenated to the corresponding olefin. For example, sodium reacts with n-hexylamine in the presence of 1,3-butadiene to smoothly produce N-sodio-n-hexylamine and butene.

These and other methods of preparation may be used to prepare the catalysts of our invention. Of the above catalysts, we prefer to employ those of the organic series because of their higher degree of catalytic effectiveness. Further, we prefer as the metal constituent the alkali metals, particularly sodium, for reasons of reactivity and economy.

It is important that the catalyst selected for a given alkylation reaction according to the present invention be carefully chosen. The amide used should be one derived from an ammonia compound which is not substantially more acidic than the amine to be alkylated with the particular catalyst. By ammonia compound we mean ammonia itself or an amine. In general, the order of decreasing acidity of ammonia compounds is aromatic>ammonia>aliphatic. Therefore, for the alkylation of aromatic amines, amides derived from aromatic amines, from ammonia, or from aliphatic amines may be used. In the alkylation of aliphatic amines, the amide chosen should be one formed from an aliphatic amine. The difference in acidity between amines within either the aliphatic or aromatic series is normally so slight that any aromatic amide may be used to alkylate any aromatic amine, and any aliphatic amide can be used as catalyst for the alkylation of any aliphatic amine.

In considering the acidity of amines, alicyclic amines and heterocyclic secondary amines, such as cyclohexylamine, piperidine, and pyrrolidine, are normally considered together with the aliphatic amines. This has likewise been done in the above remarks concerning amine acidity.

The catalysts of the invention may be prepared beforehand and then placed into the alkylation reactor with the alkylation reactants, or the catalyst can be prepared in situ in the presence of the alkylation reactants. We prefer, particularly in the case when the organo amides are used as catalysts, to prepare the catalyst beforehand and then place it into contact with the alkylation reactants. We have unexpectedly found that when the catalyst is prepared in this manner (before being placed in contact with the reactants), not only is a more reactive catalyst formed, but the catalyst frequently has a profound effect on the distribution of alkylation products subsequently formed. The latter is one of the key features of the present invention.

Along with this it should be mentioned that although our process is capable of use for both the mono- and dialkylation of primary amines, we have found that, particularly in the aromatic series of amines, the reaction can be controlled so as to be quite specific towards monoalkylation. We regard this as one of the outstanding advantages of our process, since prior methods always lead to mixtures containing substantial quantities of dialkylated aromatic primary amines. However, with our process, as will be seen in the examples which follow, it is possible to prepare monoalkylamines in high yields and conversions to the exclusion of dialkylated aromatic amines. In spite of this, it is possible (see Example V below) to dialkylate aromatic primary amines by our process. We have found that the selectivity of our process is less marked in the case of the aliphatic primary amines.

The amount of catalyst to be used can vary over wide ranges without particularly influencing the extent, course, or rate of alkylation reaction. In general, best results are obtained when the amount of catalyst is kept between about 0.01 per cent and about 10 per cent based on weight of amine to be alkylated.

We have found that the reaction of the present invention can be carried out over a wide range of temperatures. Although it varies with the type of amine to be alkylated, we can generally operate from temperatures of about 50° C. upwards, but we prefer temperatures of at least 80° C. with heterocyclic secondary amines, 120° C. with aliphatic amines, and 180° C. with aromatic amines. The upward temperature of operation is limited only by the fact that deep-seated decomposition of organic materials becomes quite rapid as extremely high temperatures are reached. Ordinarily we can operate at temperatures as high as about 400° C. with ease.

The pressures to be used can likewise vary over rather wide limits. In fact, the upper limit of pressure is fixed only by the pressure-withstanding tendencies of the equipment used. In many cases it is preferred to use as high a pressure as possible to obtain the greatest benefits in reaction rate. We have found, however, that pressures as low as 2 to 3 atmospheres can be successfully employed. This is particularly true in the case of alkylation of secondary heterocyclic amines, such as piperidine. With the aliphatic amines we prefer to operate at pressures of at least 20 atmospheres, and with the aromatic series pressures of at least 25 atmospheres are desirable.

The invention will be more fully understood by reference to the following set of illustrative examples.

*Example I*

N-sodiopiperidine catalyst was prepared from 11 parts of sodium and 260 parts of piperidine. This catalyst was charged to a pressure reactor equipped with gas inlet tubes, heating and cooling jackets, pressure and temperature measuring and recording devices, and a mechanical agitator. Two hundred and sixty parts of piperidine was charged to the reactor, which was then sealed, heated to 104° C., and pressured with ethylene. Reaction was permitted to continue for 2.25 hours with the temperature held at 108–114° C. and the pressure of ethylene between 2.7 and 55 atmospheres. A total pressure drop of 90 atmospheres occurred during this period of time. At the end of this period the reactor was allowed to cool, vented to atmospheric pressure, and the catalyst destroyed with a mixture of alcohol and water. The organic layer was separated and dried by azeotropic distillation with 180 parts of benzene, following which it was fractionally distilled through a helices-packed column. A yield of 520 parts (88 per cent) of N-ethylpiperidine, based on the amount of piperidine reacted, and a conversion of 76 per cent, based on piperidine charged, was obtained. The material had a boiling point of 128.5 to 129.5° C., and the index of refraction, $N_D^{20}$, of 1.4435.

Equally good results are obtained when the temperature of reaction is as low as 50° C. and as high as about 200° C., preferably at least 80° C. Good results are also obtained at higher pressures, such as pressures up to and including 1,000 atmospheres. Other catalysts, such as N-lithium piperidine, N-potassium piperidine, N-sodio-n-butylamine, N-sodiopyrrolidine, and the like, are equally applicable.

By the general procedure of Example I, other secondary heterocyclic amines, such as pyrrolidine, pyrroline, carbazole, piperazine, and the like, may be successfully alkylated.

*Example II*

N-sodio-n-hexylamine catalyst was prepared as follows: 400 parts of n-hexylamine and 11 parts of sodium as a suspension in 22 parts of mineral oil were placed in a stirred vessel equipped with reflux condenser and gas inlet tube. An atmosphere of nitrogen was maintained over the mixture. Over a period of 30 minutes 10 parts of butadiene was passed through the mixture at 20° C. The reaction mixture was then heated to reflux for 5 minutes, following which it was cooled under nitrogen and was then ready for use.

This catalyst, together with the excess n-hexylamine, was charged to a reactor similar to that of Example I, and an additional 100 parts of n-hexylamine was added. The reactor was sealed, heated to 150° C., and pressured with ethylene. Reaction was carried out for one hour at a temperature of 147–159° C. with the pressure varying between 27 and 41 atmospheres. During this time a total pressure drop of 52 atmospheres took place. The reactor was repressured with ethylene from time to time during the run to bring the pressure back up to the higher value. The product was worked up in a manner similar to that of Example I. The yield was 169 parts (26.5 per cent yield) of N-ethyl-N-n-hexylamine and 66 parts (8.5 per cent yield) of N,N-diethyl-N-n-hexylamine, both based on n-hexylamine charged to the reactor. The conversion of n-hexylamine was 75 per cent.

Good results in the above procedure are also obtained at temperatures varying between about 50° C. and about 400° C., preferably at least 120° C. Longer and shorter reaction times may be used, with the yield and conversion generally being a direct function of reaction time up to the point of complete conversion. Other catalysts, such as the lithium, potassium, casium, calcium, magnesium, and barium derivatives of n-hexylamine, as well as similar metallic derivatives of other alkylamines, such as ethylamine, propylamine, di-n-hexylamine, and the like, can also be employed. Pressures may vary from about 20 atmospheres up to as high as 1,000 atmospheres or more. Other primary amines, such as ethylamine, propylamine, butylamine, amylamine, and higher amines, may also be alkylated by this procedure.

Example III

N-sodiodibutylamine catalyst was prepared from 11 parts of sodium, 10 parts of butadiene, and 307 parts of di-n-butylamine in a manner similar to that of Example II. The catalyst mixture was charged to the reactor along with an additional 153 parts of dibutylamine. The reaction temperature was 132–135° C.; pressure, 20–55 atmospheres; and reaction time, 5 hours. A total pressure drop of 62 atmospheres was observed. The product was worked up in the usual way and was found to comprise 354 parts (63 per cent yield based on dibutylamine charged to the reactor and 68 per cent based on di-n-butylamine reacted) of dibutylethylamine.

The scope of Example III may be varied substantially as that of Example II.

Example IV

In a manner similar to that of the previous examples, aniline was ethylated with ethylene using preformed N-sodioanilide as the catalyst. The reaction temperature was 250–255° C., the reaction time was 1.9 hours, and the pressure was 27–48 atmospheres. A 29.7 per cent yield, based on the aniline charged (80 per cent based on the aniline reacted), of N-ethylaniline was also obtained. No diethylaniline was observed.

Example V

The procedure of Example IV was repeated except that the reaction time was 4 hours. In addition to a 64 per cent yield of N-ethylaniline (85 per cent yield on basis of aniline reacted), a 0.8 per cent yield of N,N-diethylaniline was obtained.

The above Examples IV and V illustrate one of the key features of a preferred modification of the present invention; that is, when using the preferred form of catalyst; namely, the organo amide of an alkali metal which is preformed before being placed in contact with the reactants rather than prepared in situ, the alkylation reaction is subject to extremely fine control. Thus, as illustrated in Example IV, it is possible to obtain a good yield of monoethylaniline in a reasonable reaction time without observing any diethylated product. Of course, the unreacted aniline of Example IV can be recycled to produce more monoethylaniline. As Example V shows, it is possible by continuing the reaction for longer times to obtain the dialkylated product. If the reaction of Example V is carried out for even longer periods of time, then greater quantities of dialkylation product will be obtained. This shows that in contrast to prior art methods it is possible with the new invention to regulate reaction conditions to obtain exclusively the products of choice.

Example VI

Aniline was ethylated with ethylene using as the catalyst calcium anilide which was preformed by heating calcium with aniline. The reaction temperature was 300° C., the pressure varied from 40–55 atmospheres, and the reaction time was 1.5 hours. The yield of N-ethylaniline was 23 per cent based on the aniline charged to the reactor (51 per cent based on aniline reacted). No diethylaniline was observed.

Example VII

Aniline was alkylated with propylene using preformed N-sodioanilide as the catalyst. The reaction conditions were: temperature, 330° C.; pressure, 45–49 atmospheres; reaction time, 0.5 hour. A 6.3 per cent yield, based on aniline charged (29 per cent based on aniline reacted), of N-isopropylaniline was obtained. No diisopropylaniline was observed.

Example VIII

N-methylaniline was ethylated with ethylene using preformed N-sodio-N-methylaniline as the catalyst. The reaction temperature was 147–159° C.; pressure, 40–55 atmospheres; reaction time, 4.5 hours. A 48 per cent yield of N-methyl-N-ethylaniline, based on N-methylaniline charged (63 per cent based on N-methylaniline reacted), was observed.

Example IX

Aniline was ethylated with ethylene using preformed N-potassium anilide as the catalyst. Reaction conditions were: temperature, 258–260° C.; pressure, 40–50 atmospheres; reaction time, 2 hours. A 28 per cent yield of N-ethylaniline, based on aniline charged (62 per cent based on aniline reacted), was obtained. No N,N-diethylaniline was observed.

Example X

Aniline was ethylated with ethylene in the presence of preformed N-lithium anilide catalyst. Reaction conditions were: temperature, 290–295° C.; pressure, 40–55 atmospheres; reaction time, 3 hours. A 25 per cent yield of N-ethylaniline, based on aniline charged (83 per cent based on aniline reacted), was obtained. No N, N-diethylaniline was observed.

Example XI

Aniline was ethylated with ethylene using preformed magnesium anilide as the catalyst. Reaction conditions were: temperature, 330° C.; pressure, 40–55 atmospheres; reaction time, 4 hours. A 9 per cent yield of N-ethylaniline, based on aniline charged (64 per cent based on aniline reacted), was obtained. No diethylaniline was observed.

Example XII o-Toluidine was ethylated with ethylene using preformed N-sodio-o-toluidine as the catalyst. Reaction conditions were: temperature, 250° C.; pressure, 40–50 atmospheres; reaction time, 2.5 hours. A 27 per cent yield of N-ethyl-o-toluidine was obtained.

Each of the above Examples IV through XII may be carried out at pressures as low as about 25 atmospheres and as high as about 1,000 atmospheres or more. In addition to aniline and o-toluidine, other primary aromatic amines, such as naphthylamines, amino anthracenes, nuclearly alkylated anilines, amino anthracene, and amino naphthalenes, and the like, may also be employed. Temperatures may vary from about 50 to about 400° C., preferably at least 180° C. Other catalysts, such as the barium, strontium, and cesium derivatives of aromatic amines, may be used, as may other olefin alkylating agents of the type cited above.

*Example XIII*

Aniline is ethylated with ethylene at elevated temperature and pressure using as the catalyst sodamide. Conditions employed are similar to those of Examples IV through XII, and similar results are obtained.

The use of other amides, such as lithium amide, calcium amide, potassium amide, and the like, gives similar results in this procedure.

We claim:

1. Process for the alkylation of an amine, comprising reacting said amine with a non-conjugated olefin in the presence of a preformed amide of a metal selected from the group consisting of alkali and alkaline earth metals, said process being carried out at elevated temperature, said amide catalyst being a derivative of an ammonia compound not more acidic than said amine.

2. Process for the alkylation of an amine, comprising reacting said amine with a non-conjugated olefin in the presence of a preformed catalyst comprising an organo amide of a metal selected from the group consisting of alkali metals and alkaline earth metals, said process being carried out at elevated temperature, said amide catalyst being a derivative of an ammonia compound not more acidic than said amine.

3. Process of claim 2 in which said amine is an aromatic amine.

4. Process for the ethylation of aniline, comprising reacting aniline with ethylene at temperatures of at least 180° C. and pressures of at least 25 atmospheres in the presence of a preformed N-sodioaniline catalyst.

5. Process for the alkylation of an amine, comprising reacting said amine with a non-conjugated olefin in the presence of a preformed catalyst comprising an organo amide of a metal selected from the group consisting of alkali metals and alkaline earth metals, said process being carried out at a temperature of at least 80° C. and a pressure of at least 2 atmospheres, said amide catalyst being a derivative of an ammonia compound not more acidic than said amine.

6. Process of claim 5 in which said amine is a primary aromatic amine.

7. Process of claim 5 in which said amine is aniline.

8. Process of claim 5 in which said amine is a secondary aromatic amine.

9. Process for the ethylation of N-methyl aniline, comprising reacting N-methyl aniline with ethylene at temperatures of at least 180° C. and pressures of at least 25 atmospheres in the presence of preformed N-sodio-N-methyl aniline catalyst.

10. Process of claim 5 in which said amine is an aliphatic amine.

11. Process of claim 5 in which said amine is a primary aliphatic amine.

12. Process for the ethylation of n-hexylamine, comprising reacting n-hexylamine with ethylene at temperatures of at least 120° C. and pressures of at least 20 atmospheres in the presence of preformed N-sodio-n-hexylamine catalyst.

13. Process of claim 5 in which said amine is a secondary aliphatic amine.

14. Process for the ethylation of di-n-butylamine, comprising reacting di-n-butylamine with ethylene at temperatures of at least 120° C. and pressures of at least 25 atmospheres in the presence of preformed N-sodio-dibutylamine catalyst.

15. Process of claim 5 in which said amine is an alicyclic amine.

16. Process for the ethylation of piperidine, comprising reacting piperidine with ethylene at temperatures of at least 80° C. and pressures of at least 2 atmospheres in the presence of preformed N-sodio-piperidine catalyst.

17. Process of claim 5 wherein said amide catalyst is a derivative of the amine to be alkylated.

References Cited in the file of this patent

UNITED STATES PATENTS

| | | |
|---|---|---|
| 2,449,644 | Danforth | Sept. 21, 1948 |
| 2,501,556 | Whitman | Mar. 21, 1950 |